Oct. 8, 1957
N. SILVER
2,809,341
VOLTAGE REGULATOR
Filed Feb. 13, 1956
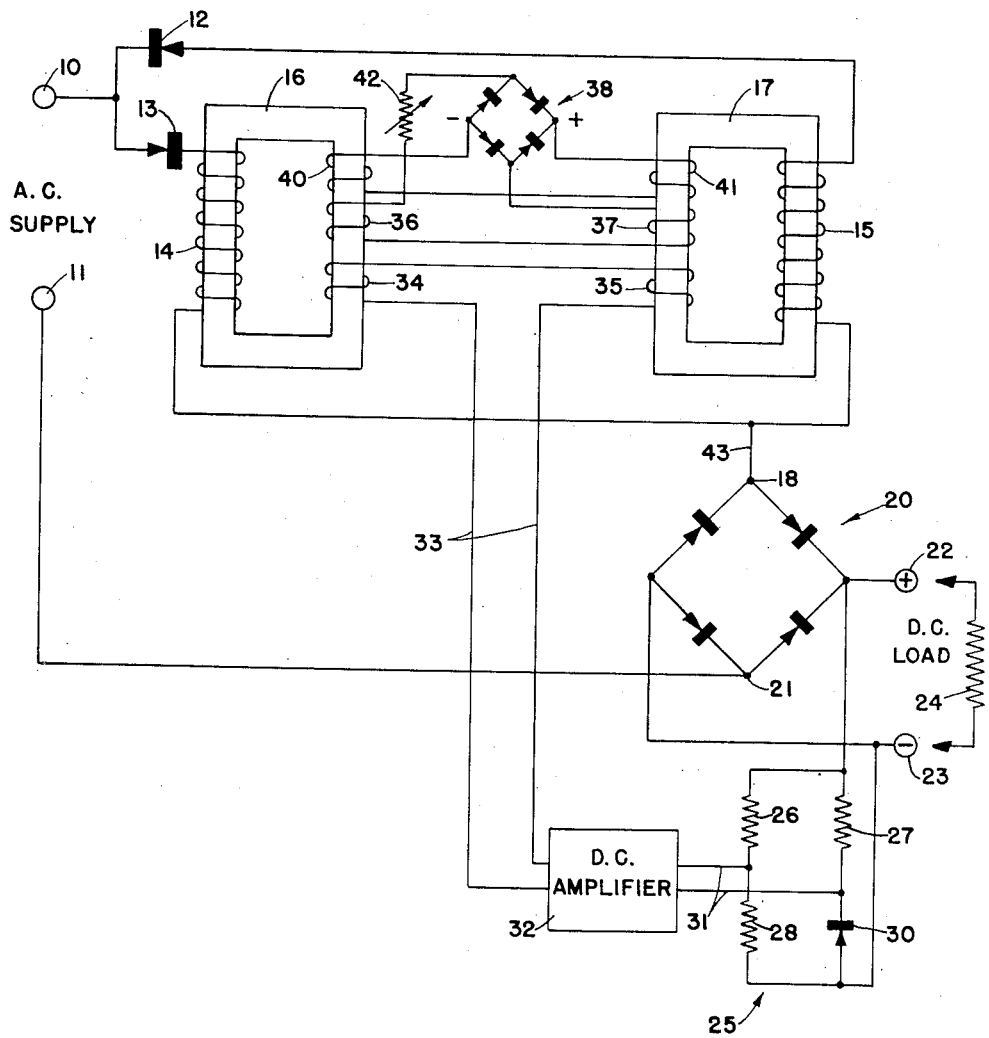
NATHANIEL SILVER
INVENTOR
BY Ralph E. Bitner.
ATTORNEY United States Patent Office 2,809,341
Patented Oct. 8, 1957

2,809,341

VOLTAGE REGULATOR

Nathaniel Silver, Stamford, Conn., assignor to Sorensen & Company, Incorporated, a corporation of Connecticut Application February 13, 1956, Serial No. 564,969

4 Claims. (Cl. 321—19)

This invention relates to a voltage regulator which rectifies an alternating current supply and provides direct current power at a pair of load terminals which maintains a load voltage within a narrow range of values. The invention has particular reference to a negative feed back control circuit which may be adjusted to provide over-compensation of the output voltage.

Voltage regulators (A. C. to D. C.) have been employed to stabilize an output voltage by sensing the error voltage and applying this value to a variable impedance coupled to the alternating current power supply. Examples of such circuits are described in United States Patent, 2,721,303, issued to N. Silver on October 18, 1955, and Patent, 2,721,304, issued to N. Silver and D. W. Tanner on the same date. Regulators of this type provide good regulation of the output voltage but cannot be adjusted for over-compensation because the control voltage is coupled to the output voltage and there is no control derived from the input voltage.

The present invention employs two control circuits, one coupled to the output terminals and one coupled to a circuit which is supplied with all the variations of the input voltage. With this arrangement the output voltage may be adjusted to rise when the input voltage is lowered and in addition, the circuit has a greater operating range.

One of the objects of this invention is to provide an improved voltage regulator which avoids one or more of the disadvantages and limitations of prior art arrangements.

Another object of the invention is to provide a voltage regulator capable of over-compensation.

Another object of the invention is to reduce the cost of voltage regulators by eliminating many of the circuit components generally used in circuits of this type.

Another object of the invention is to insure accurate voltage regulation at a direct current load when the frequency of the alternating current input varies over a considerable range.

The invention comprises an input circuit which is for connection to an alternating current power supply which may vary considerably in applied voltage. A magnetic system including two saturable paramagnetic cores comprises a variable series impedance between the input and output circuits. Two reactance windings, each on one of the cores, are connected in series with a rectifier unit so that positive pulses are transmitted by one winding and negative pulses are transmitted by the other winding. The reactance windings with their rectifiers are connected in parallel and transmit power from one of the input terminals to a power rectifier system.

A first and second control winding are placed on each of the cores and vary the average magnetic flux in the cores. The first of these control windings is coupled to a sensing circuit which is connected to the output terminals. The second control winding is connected to an inductive winding, through a rectifier system, which receives an alternating current proportional to the input voltage. The sensing circuit may be a bridge with one of its arms containing a voltage reference component. An amplifier may be used between the sensing circuit and the first control winding.

The figure is a schematic diagram of connections of one form of the voltage regulator and shows a bridge sensing circuit and a direct current amplifier between the sensing circuit and a control winding.

Referring now to the figure, input terminals 10, 11, are to be connected to a supply of alternating current which may vary in applied voltage. Terminal 10 is connected to two power rectifier units 12 and 13 and these units are respectively connected to reactance windings 14 and 15 (on cores 16 and 17) which are joined at their other ends and connected to one junction 18 of a rectifier system 20. The negative terminal 11 is connected directly to the opposite junction 21 of rectifier system 20.

The other junctions of rectifier system 20 are connected to output terminals 22 and 23 which are to be connected to a direct current load 24. The voltage across terminals 22, 23, is required to be within a desired range of values, in this case ±.1%.

In order to regulate the D. C. voltage, a direct current bridge 25 is employed, containing three resistors 26, 27, and 28. The fourth arm contains a "Zener" crystal diode 30 inserted in the circuit so as to receive current in the opposite direction from the usual conductive relationship. It is well-known that crystal diodes, in their normally non-conductive direction, possess a current-voltage characteristic having a sharp bend at a voltage which is generally called the "Zener" voltage. When a crystal diode is operated at a voltage slightly in excess of this voltage the characteristic curve comprises almost a straight line substantially parallel to the voltage axis. When operated at this point, the voltage across the diode 30 is constant and all the variations will appear across resistor 27. Since the potential drop across resistor 26 varies only a small amount, the output voltage variations, plus or minus, are applied to conductors 31, and are available for amplification by amplifier 32.

The output of amplifier 32 is applied to conductors 33 and to a first control pair of windings 34 and 35 on each of the cores 16 and 17. Windings 34 and 35 are connected in series bucking array so that the alternating voltages induced by the alternating flux in cores 16 and 17 is substantially cancelled. The direct current from amplifier 32 controls the average magnetization of the saturable cores and varies the reactive impedance of power windings 14 and 15.

The direct current amplifier 32 may contain vacuum tubes or transistors and in some applications may be a magnetic amplifier. The amplifier may be omitted entirely with conductors 31 connecting to conductors 33, although in this latter case the range of voltages on the output terminals is necessarily increased.

Two inductive windings 36 and 37 are placed on cores 16 and 17 and connected in a manner which causes the inducted alternating voltages to add. The terminals of this circuit are connected to a rectifying circuit 38 (in this case a four-armed bridge) and the rectified currents applied to two control windings 40 and 41. It is the current in these windings which controls the impedance of reactance windings 14 and 15 and permits an adjustment for over-compensation. A variable resistor 42 in the alternating current winding circuit allows an operator to vary the control.

The operation of this circuit is as follows: The alternating current power is applied at terminals 10 and 11, the positive halves of each cycle passing through rectifier 13 and winding 14, the negative halves passing through rectifier 12 and winding 15. These circuits are joined at conductor 43 and the usual alternating current power is applied to junctions 18 and 21 of rectifier system 20 which produces direct current at terminals 22, 23, and in load 24.

The passage of unidirectional current pulses through windings 14 and 15 produces a certain amount of self-bias in the magnetic core. Windings 34 and 35 also contain direct current which adds to this magnetic bias and while windings 40 and 41 contain direct current which subtracts from the bias value.

When the output voltage is increased, because of an increased value of resistance in load 24, the increase or error voltage is transmitted to amplifier 32 and the amplifier output is applied to windings 34 and 35, lowering the average magnetic flux and increasing the reactance of windings 14 and 15 and thereby lowering the output voltage to the desired value. If the input voltage, across terminals 10 and 11, is increased, the result is an increase of voltage at the output terminals and an increased current in windings 36 and 37. The increase in voltage across the output terminals results in a sequence of events as outlined above. The increase in current in coils 36 and 37 causes an additional direct current to flow in windings 40 and 41 and this current induces a nonvarying flux in cores 16 and 17 which opposes the bias flux caused by windings 14, 15, 34, and 35, increasing the reactance of windings 16 and 17, and lowering the output voltage to the desired value. If the resistance 42 is made small or if windings 40 and 41 are made large, the direct current in windings 40 and 41 is enough to lower the output voltage below the predetermined value and over-compensation is attained.

While the figure shows separate control windings 34 and 35 it will be obvious that a single winding, enclosing both of cores 16 and 17, can be substituted with the same result. Also windings 40 and 41 can be combined in a similar manner. Combining windings 36 and 37 is possible but the winding must be done in a manner which will add the alternating voltages produced by core 17 to the voltages produced by core 16.

While there has been described and illustrated a specific embodiment of the invention, it will be obvious that changes and modifications can be made therein without departing from the field of the invention which should be limited only by the scope of the appended claims.

I claim:

1. A voltage regulator comprising: an input circuit having input terminals for the application of alternating current power which may vary in applied voltage; an output circuit including output terminals for connection to a direct current load, the voltage of which varies within a restricted range; a first rectifier system connected to the output circuit; a sensing circuit connected across the output terminals which produces an error voltage whenever the output voltage differs from a predetermined value; two saturable cores of paramagnetic material each supporting a reactance winding connected in series with a rectifier unit, said reactance windings with their rectifier units connected in parallel between one of the input terminals and said first rectifier system, said rectifier units disposed to send positive current pulses through one reactance winding and negative current pulses through the other reactance winding, said first rectifier system also connected to the other of said input terminals; a first control winding on each of said cores for altering the average magnetic flux in said cores and changing the reactance of said reactance windings, said first control windings coupled to the sensing circuit; an inductive winding on each of said cores for generating an alternating voltage which is proportional to the applied voltage, said inductive windings connected to a second rectifier system which generates a direct current signal; and a second control winding on each of said cores coupled to said second rectifier system and receiving direct current power therefrom.

2. A voltage regulator in accordance with claim 1 wherein an adjustable coupling means is connected between said inductive windings and said second control windings.

3. A voltage regulator in accordance with claim 2 wherein an amplifier is connected between the sensing circuit and said first control windings for amplifying the error voltage and sending a current through said control windings which is proportional to the error voltage.

4. A voltage regulator in accordance with claim 3 wherein said sensing circuit comprises a four-armed bridge, one of said arms containing a crystal diode.

References Cited in the file of this patent

UNITED STATES PATENTS

| | | |
|---|---|---|
| 2,144,290 | Hanley | Jan. 17, 1939 |
| 2,309,156 | Andrews | Jan. 26, 1943 |
| 2,653,293 | Huge | Sept. 22, 1953 |
| 2,765,436 | Darnboefer | Oct. 2, 1956 |